Feb. 7, 1967 G. K. BENSING 3,303,334
BIASING CONTROL USING SATURABLE MAGNETIC CORES
Filed Sept. 27, 1963
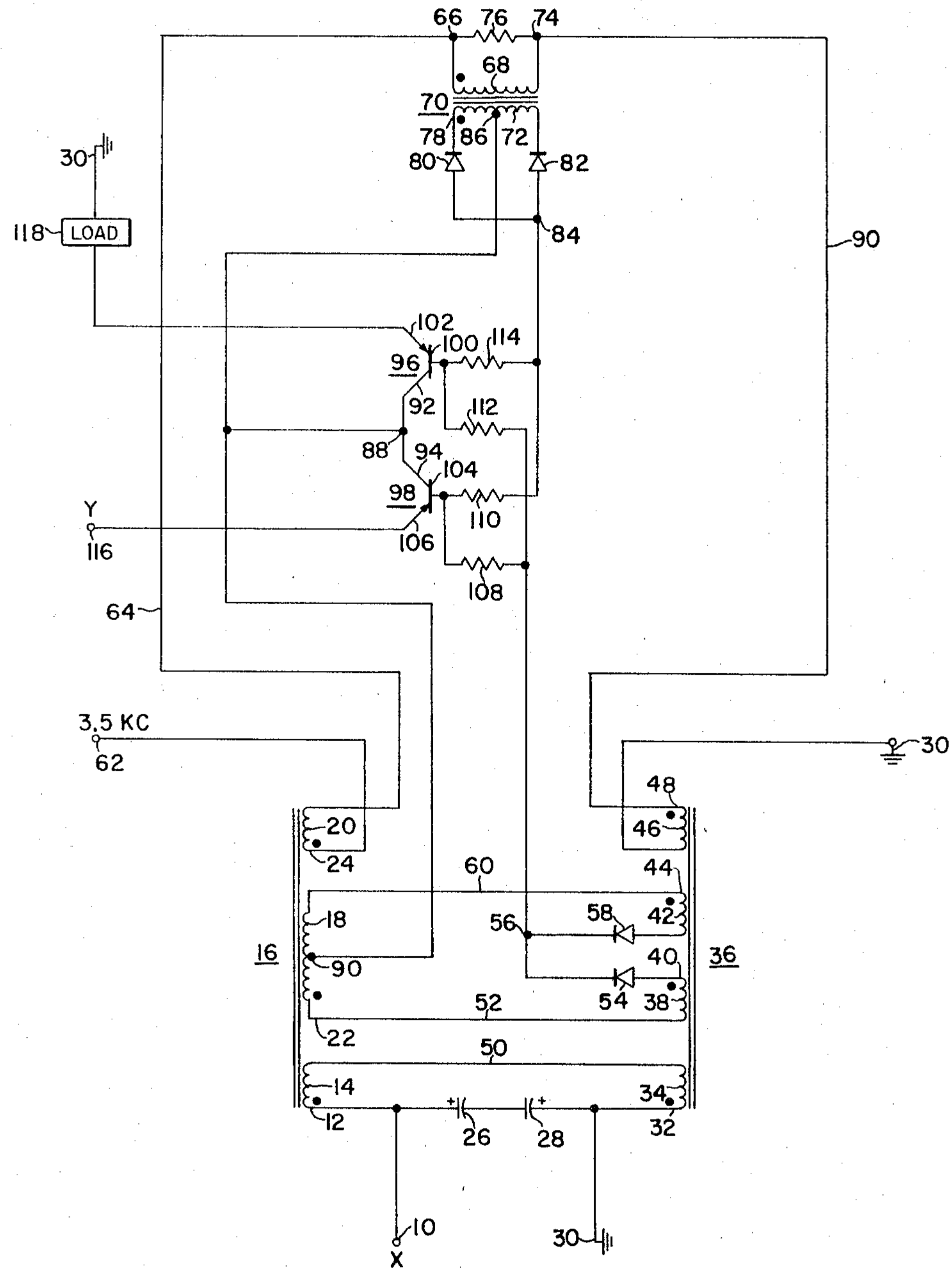
INVENTOR.
GERALD K. BENSING
BY Roger W. Jensen
ATTORNEY United States Patent Office 3,303,334

Patented Feb. 7, 1967

3,303,334
BIASING CONTROL USING SATURABLE MAGNETIC CORES

Gerald K. Bensing, New Brighton, Minn., assignor to Honeywell Inc., a corporation of Delaware Filed Sept. 27, 1963, Ser. No. 312,031
10 Claims. (Cl. 235—156)

This invention pertains generally to electronic circuitry and more particularly to electronic circuitry utilizing saturable magnetic cores. Even more specifically the invention lies in the use of a biasing means in conjunction with the saturable magnetic cores wherein a switching means, such as a pair of transistors, is biased to an OFF condition until occurence of saturation in the core whereupon the bias currents are removed to allow a control signal to have its full effect upon the switching means.

While the prior art has used saturable magnetic cores to actuate switching means such as transistors upon occurrence of saturation of the cores, there has been considerable trouble due to leakage currents accidentally turning the transistor to an ON condition prior to the time the saturation occurs in the magnetic cores. To overcome the problem some designs have utilized an external power suply to bias the transistors to an OFF condition. However, this solution has the disadvantage that the control signal must overcome this bias before the transistors can be turned completely ON. This means that current is not only used for biasing but additional current must be used to overcome this biasing. It can therefore be realized that there is a considerable waste of power and lowering of efficiency of the circuit over what it would be if this bias current were only presented to the transistors when it was desired to keep the transistors OFF.

As mentioned above, this invention accomplishes the desired result of applying a bias signal or current to the transistors, or other switching means, to hold these transistors in an OFF condition until occurrence of saturation in the saturable magnetic core and at this time the bias current disappears so that the control signal does not have to overcome any bias currents and can more quickly turn the transistors ON. The terms ON and OFF are used by way of illustration and not by means of limitation and it should be realized that the above description is only to one preferred embodiment used in a multiplying circuit and that there may be many others.

It is an object of this invention to provide a magnetic circuit in which greater efficiency in the use of electric currents is achieved.

Further objects and advantages of this invention will be realized from a reading of the specification and the appended claims along with the single figure which is a schematic diagram of one embodiment of the present invention.

In the figure an input terminal 10, also labeled X, is connected to one end 12 of a winding 14 on a saturable magnetic core means 16. Saturable magnetic core 16 also has a center tapped winding 18 and a third winding 20. A lead 22 on winding 18 and a lead 24 on winding 20 as well as lead 12 on winding 14 are all the start of each winding and when one of these leads is positive with respect to the other end of the winding all of these respective points are positive with respect to the other end of the winding. This start of the winding is designated by a small dot at this end of the winding as is customary in the art and these dots will be used to provide similar designations on other magnetic cores described in this specification. Two capacitors 26 and 28 are connected in series between input 10 and ground or reference potential 30. Although two capacitors are shown, it is not necessary to use two capacitors if enough capacitance and a high enough voltage level rating can be obtained from one capacitor. Ground 30 is also connected to one end 32 of a winding 34 on a second saturable magnetic core means 36. Saturable magnetic core 36 has a second winding 38 with a first lead 40 and a third winding 42 with a first end lead 44 and a fourth winding 46 with a first end lead 48. End leads 32, 40, 44 and 48 are the dotted end leads as previously explained. The unnumbered ends of the windings 14 and 34 are connected together by a lead 50. End 22 of winding 18 is connected by a lead 52 to the unnumbered end of winding 38. A diode means, rectifying means or unidirectional current means 54 is connected between a junction point 56 and the lead 40 of winding 38 in a manner to allow the curent flow toward junction point 56. A diode means, rectifying means or unidirectional current means 58 is connected between the junction point 56 and the unnumbered end of winding 42 in a manner to allow the direction of easy current flow toward junction point 56. End 44 of winding 42 is connected by a lead 60 to the unnumbered end of winding 18. The end 24 of winding 20 is connected to an input 62 also labeled 3.5 kc. The other end of winding 20 is connected by a lead 64 to a junction point 66 at the dotted end of a winding 68 on a transformer 70 having a center tapped secondary winding 72. Winding 68 is a primary winding and has the other end thereof connected to a junction point 74. A resistive means 76 is connected between the two ends of the winding 68. The resistor 76 is used for adjusting the gain of the apparatus and is not necessary to the practice of the invention. The dotted end of winding 72 is numbered 78. Two diode means, rectifying means or unidirectional current means 80 and 82 are connected by their anodes to a junction point 84 and connected by their cathodes to oposite ends of the winding 72 of transformer 70. As thus described the direction of easy current flow is away from junction point 84. A center tap 86 on winding 72 is connected to a junction point 88 and also to a center tap 90 on winding 18 of saturable magnetic core 16. The junction point 74 at one end of winding 68 on transformer 70 is connected by a lead 91 to the end 48 of winding 46 on saturable magnetic core means 36. The unnumbered end of winding 46 is connected to ground 30. The junction point 88 is connected to collectors 92 and 94 of PNP matched symmetrical transistors 96 and 98 respectively. Transistor 96 also has a base 100 and an emitter 102. Transistor 98 has a base 104 and an emitter 106. These two transistors may be considered as a single unit and as a single unit may be termed a chopper, a switching means, or valve means. The transistors as a pair of units are also usable in other electronic forms such as a pair of switches if this may be desirable or electronic tubes or valves. In this specification the term transistors is used by way of illustration and not by way of limitation. A resistive or impedance means 108 is connected between base 104 of transistor 98 and junction point 56. A resistive or impedance means 110 is connected between base 104 and junction point 84. A resistive or impedance means 112 is connected between base 100 of transistor 96 and the junction point 56. A resistance or impedance means 114 is connected between base 100 and the junction point 84. An input terminal 116 also labeled Y is connected to emitter 106 of transistor 98. A load means 118 is connected between ground 30 and the emitter 102 of transistor 96.

In operation, a 3.5 kc. signal is applied between junction point 62 and the unnumbered end of winding 46. Although this lead is shown connected to ground this is shown merely for convenience. In actual practice it has been found that the least noise is introduced in the circuit by connecting these two leads to opposite ends of a center tapped transformer winding which has the center tap connected to ground. However, where noise is not a problem the connection as shown can readily be made. With no input signals at terminals 10 and 116, there will be no ontput. The reason for there not being any output is due to the fact that the cores 16 and 36 do not saturate unless there is an input signal at terminal 10. Since the windings 18, 38 and 42 in conjunction with diodes 58 and 54 bias the transistors 96 and 98 to an OFF condition until saturation of the cores occur, these transistors will continue in the OFF condition throughout the time period of each half cycle of the 3.5 kc. signal. The 3.5 kc. signal has been used for illustrative purposes and is not to be used as a limitation. It will be realized that if a different switching frequency from 3.5 kc. is used, different components including the number of turns in the winding will have to be used. However, with the windings as selected and with the 3.5 kc. switching signal, the flux in the core changes throughout the half cycle so as to provide an output signal to bias transistors 96 and 98 to an OFF condition as long as no input signal is applied at terminal 10. However, even if transistors 96 and 98 were to turn ON, if there were no input signal being applied at input Y there would still be no output signal. This is true because the input signal Y controls the amplitude of the output signal. As may be surmised from the previous discussion the input signal X controls the width of the output signal. It does this by controlling the point at which saturation occurs in the windings on cores 16 and 36 as a function of the amplitude of the signal being applied. In other words, a larger signal at terminal 10 will increase the magnetic flux in cores 16 and 36 and thereby reduce the amount of time necessary for the 3.5 kc signal to add enough flux to saturate the cores 16 and 36. Thus as the signal X is increased in amplitude the cores 16 and 36 will saturate earlier in each half cycle of the 3.5 kc. signal and thereby remove the OFF biasing signal from transistors 96 and 98. At the time of saturation of either core 16 or 36, the signal which is being applied from terminal 62 through winding 20, winding 68 of transformer 70, lead 90, and winding 46 to ground suddenly increases in amplitude across winding 68. This increase in amplitude increases the output voltage and through the rectifiers 80 and 82 applies a control signal to transistors 96 and 98 to turn these transistors to an ON condition. As mentioned previously, these two transistors are matched symmetrical chopper transistors and by applying a signal whereby the collectors 92 and 94 are positive with respect to the bases 100 and 104, respectively, these transistors will turn to an ON condition. By using the matched transistors in the configuration shown, the voltage drops and voltage rises will be such so as to almost cancel out any voltage drop in the transistors between emitters 106 and 102 and thereby place a negligible error into the amplitude of the signal as applied to load 118. Although there is a slight output signal from transformer 70 before saturation of core 16 or 36 occurs, this output signal is not enough to overcome the bias obtained from the windings 18, 38 and 42 on cores 16 and 36. By following through the dots on the windings and cores 16 and 36 it may be noted windings 14 and 34 are connected so as to completely cancel the alternating signal output. In other words an output obtained from each of these two windings due to the changing current flux in cores 16 and 36 prior to saturation could provide an error in the output due to a bias signal being developed in opposition to the input signal X. In the present connection this induced voltage is completely cancelled and has no detrimental effect on the input signal X.

As will be realized from the above discussion, the apparatus shown and described provides a pulse amplitude-pulse width modulated multiplying system. The Y input determines the amplitude of the signal applied to load 118 and the X input determines the saturation time of saturable core transformers 16 and 36 so as to determine the length of time that transistors 96 and 98 are turned ON. In other words, the X input determines the pulse width of the output signal. As is known to those skilled in the art, pulse amplitude-width multipliers are old and this is merely a different and novel circuit for accomplishing this type of multiplication.

However, the novel multiplier is not the only feature of the circuit since the multiplier utilizes a new and novel method of making sure that transistors are positively controlled as to being ON or OFF. This second feature of the invention was clearly brought out earlier in the specification.

As is implied in the above discussion, the cores 16 and 36 saturate on alternate half cycles of the input power signal. In other words, with a signal being applied at terminal X, the flux in core 16 will be increased while the flux in core 36 will be decreased on a specific half cycle of the input signal. On the next half cycle of the input power signal the opposite effect will occur. In other words, the flux in core 36 will be increased while the flux in core 16 will be decreased. However, the occurrence of saturation will still drop the output signal from the windings 18, 38 and 42 enough so that a bias current is no longer being applied to the transistors 96 and 98. Although the invention has been described using two cores, it will be realized that in some instances one core may be used if compensating networks are incorporated in the driving circuit which applies the signal X to terminal 10.

Although the biasing winding to hold transistors 96 and 98 in the OFF condition can be placed on only one of the cores, this might provide an unbalance in the fluxes of the cores so as to produce an error in the output. For this reason the windings have been placed on both of the cores to thereby cancel out or at least minimize any errors due to the biasing currents being obtained from these cores to hold transistors 96 and 98 in the OFF condition.

It will be apparent to those skilled in the art that many modifications and alterations may be made to the circuitry shown and still stay within the concepts of this invention. In other words it is not necessary that matched symmetrical chopper transistors be used but other types of transistors may be used and still obtain acceptable results in some instances. It is also possible that vacuum tubes or other switching devices may be used satisfactorily. Further, it is not necessary that a pair of these devices be used in all instances but that only one may be used in some applications. As mentioned previously the invention lies at least partly in the use of a winding on a saturable core reactor to bias a switching means in one condition until it is desired to place it in another condition so as to eliminate an external power source to accomplish this same result.

While the specific preferred embodiment of a multiplier has been shown to illustrate the invention, I do not wish to be limited to this embodiment or the invention as presently described but only by the scope of the appended claims, in which:

I claim:

1. Multiplying apparatus comprising, in combination:
   - first and second saturable magnetic core means, each of said core means including a plurality of windings;
   - transformer means including primary and secondary winding means;
   - means connecting the ends of said primary winding of said transformer means between one end of a first winding on said first core means and one end of a first winding on said second core means;
   - means for supplying a high frequency power signal between the other ends of each of said first windings of said first and second core means;
   - first and second transistor means including base, emitter and collector means;

first rectifying means connected to said secondary winding means of said transformer means and connected to said first and second transistor means for supplying a unidirectional signal to turn said transistor means ON when saturation of said first and second core means occurs;

load means connected to said emitter means of said first transistor means for receiving a product signal therefrom;

multiplier signal supplying means connected to said emitter means of said second transistor means, the signal from said multiplier signal supplying means controlling the amplitude of the product signal being applied to said load means;

means for supplying a multiplicand signal connected to a second winding means of each of said first and second core means, the multiplicand signal altering the saturation characteristics of said first and second core means as a function of amplitude of said multiplicand signal; and second rectifying means including winding means on at least one of said core means, said second rectifying means being connected to said first and second transistor means, and the second rectifying means biasing said first and second transistor means OFF until the occurrence of saturation of said first and second core means.

2. Multiplying apparatus comprising, in combination:

first and second saturable magnetic core means, each of said core means including a plurality of windings;

transformer means including primary and secondary winding means;

means connecting the ends of said primary winding of said transformer means between one end of a first winding on said first core means and one end of a first winding on said second core means;

means for supplying a high frequency power signal between the other ends of each of said first windings of said first and second core means;

first rectifying means connected to said secondary winding means of said transformer means and connected to said transistor means for supplying a unidirectional signal to turn said transistor means ON when saturation of said first and second core means occurs;

load means connected to said transistor means for receiving a product signal therefrom;

multiplier signal supplying means connected to said transistor means, the signal from said multiplier signal supplying means controlling the amplitude of the product signal being applied to said load means;

means for supplying a multiplicand signal connected to a second winding means of each of said first and second core means, the multiplicand signal altering the saturation characteristics of said first and second core means as a function of amplitude of said multiplicand signal; and second rectifying means including winding means on at least one of said core means, said second rectifying means being connected to said transistor means, and the second rectifying means biasing said transistor means OFF until the occurrence of saturation of one of said core means.

3. Multiplying apparatus comprising, in combination:

saturable magnetic core means, said core means including a plurality of windings;

transformer means including primary and secondary winding means;

means connecting said primary winding of said transformer means to one end of a first winding on said core means;

means for supplying a high frequency power signal to the other end of said first winding of said core means;

transistor means;

first rectifying means connected to said secondary winding means of said transformer means and connected to said transistor means for supplying a unidirectional signal to turn said transistor means ON when saturation of said core means occurs;

load means connected to said transistor means for receiving a product signal therefrom;

multiplier signal supplying means connected to said transistor means, the signal from said multplier signal supplying means controlling the amplitude of the product signal being applied to said load means;

means for supplying a multiplicand signal connected to a second winding means of each of said core means, the multiplicand signal altering the saturation characteristics of said core means as a function of amplitude of said multiplicand signal; and second rectifying means including winding means on said core means, said second rectifying means being connected to said transistor means, and the second rectifying means biasing said transistor mean OFF until the occurrence of saturation of said core means.

4. Multiplying apparatus comprising, in combination:

transistor means;

saturable magnetic core means including a plurality of winding means;

power signal supplying means connected to a first winding means of said saturable magnetic core means for supplying a square wave signal thereto, the square wave power signal by itself bringing the flux level of said saturable magnetic core means close to saturation on each half cycle;

multiplicand signal supplying means connected to a second winding means of said saturable magnetic core means for supplying a signal saturating said saturable magnetic core means at various times during each half cycle of the square wave power signal;

biasing means including a third winding means of said saturable magnetic core means connected to said transistor means for keeping said transistor means OFF until saturation occurs in said saturable magnetic core means;

further means connected to said first winding means and to said transistor means for supplying a turn ON current to said transistor means after the occurrence of saturation in said saturable magnetic core means;

multiplier signal supplying means connected to said transistor means for supplying a signal thereto; and load means connected to said transistor means for receiving a product signal therefrom, said product signal varying in amplitude in accordance with the multiplier signal and varying in duration in accordance with the amplitude of the multiplicand signal.

5. Multiplying apparatus comprising, in combination:

transistor means;

saturable core means including a plurality of winding means;

power signal supplying means connected to a first winding means of said saturable core means for supplying a square wave signal thereto, the square wave power signal by itself bringing the flux level of said saturable core means close to saturation on each half cycle;

multiplicand signal supplying means connected to a second winding means of said saturable core means for supplying a signal for causing saturation of said saturable core means during each half cycle of the square wave power signal;

biasing means including a third winding means of said saturable core means connected to said transistor means for keeping said transistor means OFF until saturation occurs in said saturable core means;

multiplier signal supplying means connected to said transistor means for supplying a signal thereto; and load means connected to said transistor means for receiving a product signal therefrom, said product signal varying in amplitude in accordance with the multiplier signal and varying in duration in accordance with the amplitude of the multiplicand signal.

6. Multiplying apparatus comprising, in combination:
switching means;
saturable core means including a plurality of winding means;
power signal supplying means connected to a first winding means of said saturable core means for supplying a square wave signal thereto, the square wave power signal by itself bringing the flux level of said saturable core means close to saturation on each half cycle;
multiplicand signal supplying means connected to a second winding means of said saturable core means for supplying a signal for causing saturation of said saturable core means;
biasing means including a third winding means of said saturable core means connected to said switching means for keeping said switching means in a first condition until saturation occurs in said saturable core means;
multiplier signal supplying means connected to said switching means for supplying a signal thereto; and
load means connected to said switching means for receiving a product signal therefrom, said product signal varying in amplitude in accordance with the multiplier signal and varying in duration in accordance with the amplitude of the multiplicand signal.

7. Control apparatus comprising, in combination:
transistor means;
saturable magnetic core means including a plurality of winding means;
means for supplying a first signal to a first winding means of said saturable magnetic core means;
control means connected to said first winding means and to said transistor means for supplying an ON control signal to said transistor means upon saturation of said saturable magnetic core means; and
biasing means including a second wniding means of said saturable magnetic core means connected to said transistor means for deenergizing said transistor means until saturation of said saturable magnetic core means occurs.

8. Control apparatus comprising, in combination:
switch means;
saturable core means including a plurality of winding means;
means for supplying a first signal to a first winding means of said saturable core means;
control means connected to said first winding means and to said switch means for supplying an ON control signal to said switch means upon saturation of said saturable core means; and
biasing means including a second winding means of said saturable core means connected to said switch means for deenergizing said switch means until saturation of said saturable core means occurs.

9. Control apparatus comprising, in combination:
transistor means including input means and output means;
saturable magnetic core means including first, second, and third winding means;
means for supplying a first signal connected to said first winding means of said saturable magnetic core means;
transformer means including primary and secondary winding means;
means connecting said primary winding means in series with said first winding means;
first unidirectional current means connected between said secondary winding means and said input means of said transistor means for applying an ON control signal to said transistor means upon saturation of said saturable magnetic core means;
second unidirectional current means connected between said second winding of said saturable magnetic core means and said input means of transistor means for supplying an OFF control signal to said transistor means until saturation of said saturable magnetic core means occurs; and
means for supplying a second signal connected to said third winding means for controlling the saturation time of said saturable magnetic core means.

10. Control apparatus comprising, in combination:
valve means including input means and output means;
saturable magnetic core means including first and second winding means;
means for supplying a first signal connected to said first winding means of said saturable magnetic core means;
control means connected in series with said first winding means and to said input means of said transistor means for applying an ON control signal to said valve means upon saturation of said saturable magnetic core means; and
second unidirectional current means connected to said second winding of said saturable magnetic core means and said input means of valve means for supplying an OFF control signal to said valve means until saturation of said saturable magnetic core means occurs.

References Cited by the Examiner

UNITED STATES PATENTS 2,903,601 9/1959 Schneider ------- 235—164 X

OTHER REFERENCES

Schaff, F. W.: Electronic Control of an Electronic Switch. In IBM Technical Disclosure Bulletin 4(8), January 1962.

MALCOLM A. MORRISON, *Primary Examiner.*

ROBERT C. BAILEY, *Examiner.*

T. M. ZIMMER, I. FAIBISCH, *Assistant Examiners.*